United States Patent
Tsuchihashi (10) Patent No.: US 7,808,682 B2
(45) Date of Patent: Oct. 5, 2010

(54) IMAGE SCANNING SYSTEM

(75) Inventor: Hidehisa Tsuchihashi, Yotsukaido (JP)

(73) Assignee: Nikon Corporation, Tokyo (JP)

( * ) Notice: Subject to any disclaimer, the term of this patent is extended or adjusted under 35 U.S.C. 154(b) by 204 days.

(21) Appl. No.: 12/232,645

(22) Filed: Sep. 22, 2008

(65) Prior Publication Data

US 2009/0034023 A1 Feb. 5, 2009

Related U.S. Application Data

(63) Continuation of application No. 10/600,842, filed on Jun. 23, 2003, now abandoned.

(30) Foreign Application Priority Data

Jun. 24, 2002 (JP) ............................... 2002-182891

(51) Int. Cl.
*H04N 1/04* (2006.01)

(52) U.S. Cl. ..................... 358/474; 358/501; 358/448; 358/475; 358/509; 382/274; 382/275; 348/96; 348/E5.112; 396/319; 355/40; 355/41

(58) Field of Classification Search ................. 358/474, 358/501, 504, 505, 475, 509, 518, 401, 409, 358/497, 301; 382/274, 275, 318, 319, 168, 382/171; 348/96, E5.112, 97; 396/319; 355/40, 41

See application file for complete search history.

(56) References Cited

U.S. PATENT DOCUMENTS

| | | | |
|---|---|---|---|
| 5,327,259 A | 7/1994 | Furusawa | |
| 6,233,059 B1 | 5/2001 | Kodaira et al. | |
| 6,240,264 B1 | 5/2001 | Yajima et al. | |
| 6,748,109 B1 * | 6/2004 | Yamaguchi | 382/167 |
| 6,873,427 B1 * | 3/2005 | Matsuda et al. | 358/1.15 |
| 7,684,722 B2 * | 3/2010 | Sawada | 399/82 |
| 2002/0071141 A1 | 6/2002 | Katakura et al. | |
| 2003/0031375 A1 * | 2/2003 | Enomoto | 382/255 |
| 2004/0071370 A1 * | 4/2004 | Yamazaki | 382/312 |

FOREIGN PATENT DOCUMENTS

JP A-08-258365 10/1996

* cited by examiner

*Primary Examiner*—Negussie Worku
(74) *Attorney, Agent, or Firm*—Oliff & Berridge, PLC (57) ABSTRACT

An image scanning system comprises: an image-capturing device that captures an image of a scan original and outputs image signals; an image processing circuit that executes image processing on the image signals; an image signal output device that outputs the image signals having undergone the image processing; a calculation device that calculates an estimated length of required time to complete image signal output after a scan instruction with regard to the scan original is issued; and a calculation result output device that outputs calculation results obtained at the calculation device.

16 Claims, 7 Drawing Sheets

IMAGE SCANNING SYSTEM

This application is a continuation of U.S. patent application Ser. No. 10/600,842, filed Jun. 23, 2003, the entire contents of which are hereby incorporated by reference.

INCORPORATION BY REFERENCE

The disclosure of the following priority application is herein incorporated by reference:
Japanese Patent Application No. 2002-182891 filed Jun. 24, 2002

BACKGROUND OF THE INVENTION

1. Field of the Invention

The present invention relates to an image scanning system that converts an image original to electronic data.

2. Description of the Related Art

There are image scanning apparatuses such as film scanners in the known art that obtain image data by capturing an image of an image original. An image scanning apparatus normally executes a preliminary image-capturing operation on an original to be scanned, which is set on a stage, and determines the image-capturing conditions to be set for the main image-capturing operation by using image signals obtained through the preliminary image-capturing operation. Then, the main image-capturing operation is executed under the image-capturing conditions thus determined. The image signals obtained through the main image-capturing operation undergo image processing executed in conformance to predetermined image processing parameters and then are recorded into a recording device as scanned image data.

If the preliminary image-capturing operation and the main image-capturing operation are executed for each of a plurality of frames of images to be scanned from a film original with the image scanning apparatus described above, the length of time required to complete the scanning of all the frames of images is bound to be considerable. For this reason, it is convenient for the operator to be able to ascertain in advance the length of time required to scan the images before starting to scan the original.

SUMMARY OF THE INVENTION

An image scanning system according to the present invention comprises: an image-capturing device that captures an image of a scan original and outputs image signals; an image processing circuit that executes image processing on the image signals; an image signal output device that outputs the image signals having undergone the image processing; a calculation device that calculates an estimated length of required time to complete image signal output after a scan instruction with regard to the scan original is issued; and a calculation result output device that outputs calculation results obtained at the calculation device.

The calculation device also calculates an estimated end time point by adding the estimated length of required time to a current time point; and the calculation result output device may output at least one of the estimated length of required time and the estimated end time point.

It is preferable that the image-capturing device executes a preliminary image-capturing operation and a main image-capturing operation on the scan original; and the calculation device calculates a total of lengths of required time to execute steps of, at least, the preliminary image-capturing operation, the main image-capturing operation, the image processing and the image signal output. It is also preferable to further comprises storage device in which an actual length of required time is stored in memory in correspondence to each of the steps, the actual length of time being a length of time having been required to actually execute a step, and it is preferable that the calculation device calculates a length of required time to execute each of the steps by averaging n values each representing the actual length of required time for executing a step, which have been stored into the storage device most recently. The calculation device may calculate a length of required time to execute each of the steps as a value most frequently indicated among values each representing the actual length of required time for executing a step, which have been stored in the storage device. It is possible to further comprise a control device that controls the storage device so as not to store the actual length of required time corresponding to a step among the steps under at least one of following conditions: if the actual length of required time for the step exceeds a predetermined length of time; if the step is canceled while the step is in progress; and if an error occurs during the step. The calculation result output device may also output a length of required time to execute each of the steps.

It is preferable that the scan original includes a plurality of frames; the calculation device calculates the estimated length of required time to complete output of all the image signals corresponding to designated frames among the plurality of frames after a scan instruction is issued with regard to the designated frames; and the calculation result output device outputs calculation results obtained by the calculation device. It is preferable that the image-capturing device executes a preliminary image-capturing operation and a main image-capturing operation for each of the designated frames; and the calculation device calculates lengths of time required to execute steps of, at least, the preliminary image-capturing operation, the main image-capturing operation, the image processing and the image signal output for each of the designated frames and also calculates a length of required time to feed the scan original.

It is also possible to comprise a storage device in which an actual length of required time is stored in memory in correspondence to each of the steps and a feed time that has been required to actually feed the scan original is also stored in memory, the actual length of required time being a length of time having been required to actually execute a step, and it is preferable that the calculation device (a) calculates a length of required time to execute each of the steps by averaging n values each representing the actual lengths of required time for executing a step, which have been stored into the storage device most recently and (b) calculates the length of required time to feed the scan original by averaging n values each representing the feed time, which have been stored into the storage device most recently. It is also possible that the calculation device (a) calculates a length of required time to execute each of the steps as a value most frequently indicated among values each representing the actual length of required time for executing a step, that have been stored in the storage device and (b) calculates the length of required time to feed the scan original as a value most frequently indicated among values each representing the feed time, that have been stored in the storage device.

A computer-readable computer program product according to the present invention has an image scan processing control program. The control program comprises: a start instruction for starting a scan of a scan original; an image signal processing instruction for executing image processing on image signals obtained by capturing an image of the scan original; an image signal output instruction for outputting the image signals having undergone the image processing; a calculate instruction for calculating an estimated length of required time to complete an output of the image signals after the start instruction for starting the scan is issued; a calculation result output instruction for outputting calculation results obtained in response to the calculate instruction. It is preferable that control is implemented in conformance to the calculation instruction so as to further calculate an estimated end time point obtained by adding the estimated length of required time to a current time point; and control is implemented in conformance to the calculation result output instruction so as to output at least one of the estimated length of required time and the estimated end time point. It is preferable that the computer-readable computer program product is a recording medium on which the image scan processing control program is recorded. The computer-readable computer program product may be a carrier wave in which the image scan processing control program is embodied as a data signal.

An image scanning method according to the present invention captures an image of a scan original; executes image processing on image signals obtained by capturing the image of the scan original; outputs the image signals having undergone the image processing; calculates an estimated length of required time to complete an output of the image signals after a scan of the scan original is instructed; and outputs calculation results with regard to the estimated length of required time.

DESCRIPTION OF THE PREFERRED EMBODIMENT

The following is an explanation of an embodiment of the present invention, given in reference to the drawings.

Figure 1:
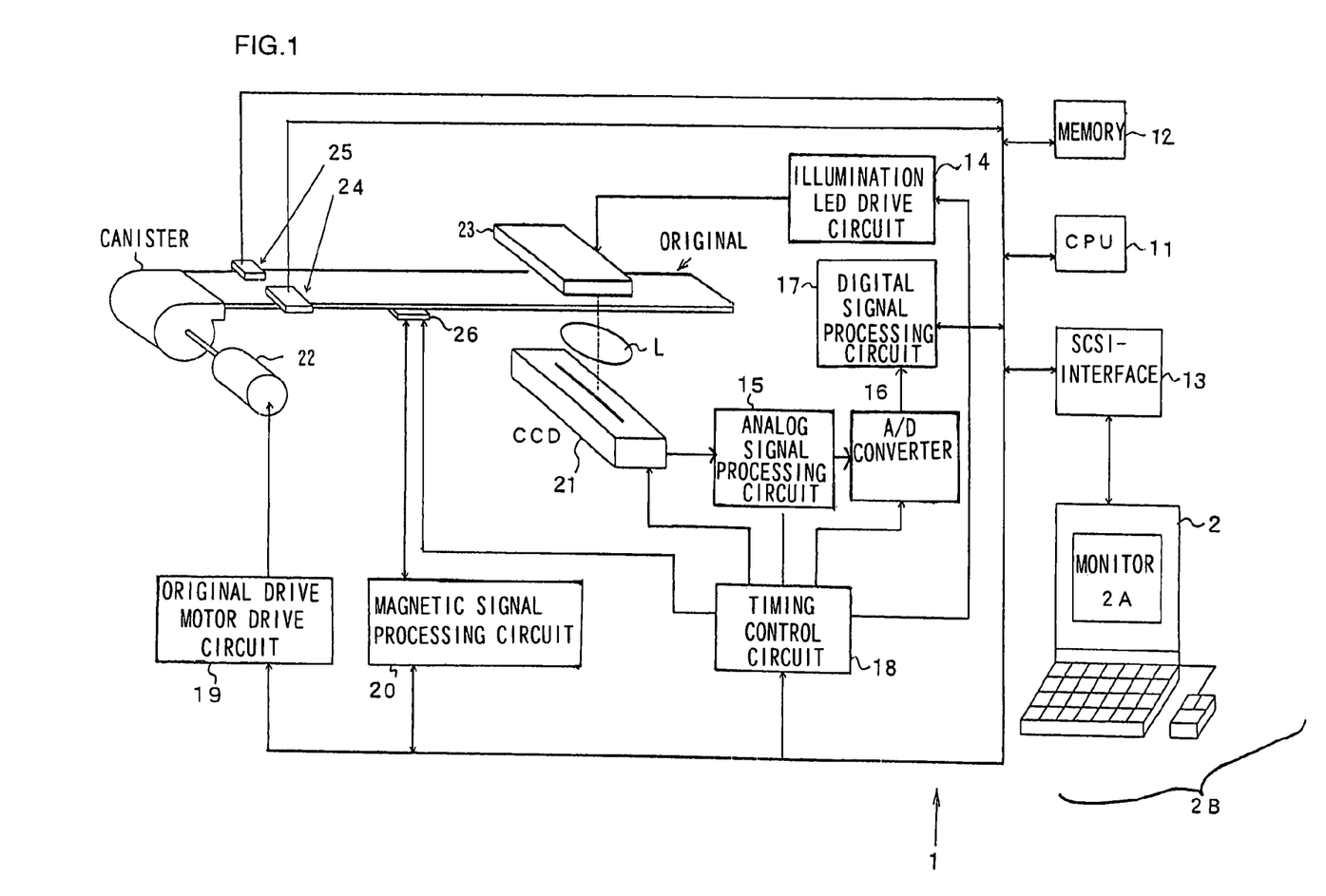
FIG. 1 is a block diagram of the image scanning system achieved in an embodiment of the present invention.

FIG. 1 is a block diagram of an image scanning system achieved in the embodiment of the present invention. In FIG. 1, the image scanning system comprises an image scanning unit 1 and a host computer 2 which may be a personal computer. The image scanning system is operated from the host computer 2. The host computer 2 includes a display monitor 2A and an operating member 2B having a keyboard and a mouse. It is to be noted that the host computer 2 also includes a CPU, a hard disk drive HDD, a memory and the like.

The image scanning unit 1 comprises a CPU 11, a memory 12, an interface circuit 13, an illumination LED drive circuit 14, an analog signal processing circuit 15, an A/D converter 16, a digital signal processing circuit 17, a timing control circuit 18, an original drive motor drive circuit 19 and a magnetic signal processing circuit 20. The image scanning unit 1 further includes a line sensor 21, a lens L, an original drive motor 22, an LED light source 23, an optical information scanning sensor 24, an original position detection sensor 25 and a magnetic head 26.

The CPU 11 engages in communication with the host computer 2 via the interface circuit 13. In addition, the CPU 11 individually controls the timing control circuit 18, the digital signal processing circuit 17, the original drive motor drive circuit 19 and the magnetic signal processing circuit 20. The memory 12 is utilized as a work area of the CPU 11. The memory 12 is also used as a storage area where various scanning conditions set for an original scanning operation to be detailed later, image data undergoing and having undergone image processing and the like are stored.

The interface circuit 13 may be constituted of, for instance, a SCSI interface. The CPU 11 receives commands transmitted from the host computer 2 via the interface circuit 13. In addition, the CPU 11 transmits image data having undergone image processing at the digital signal processing circuit 17, information with regard to the image scanning unit 1 which is stored in the memory 12 and the like to the host computer 2 via the interface circuit 13.

The illumination LED drive circuit 14 executes light emission control on the LED light source 23 that illuminates an original such as film. Illuminating light emitted from the LED light source 23 is transmitted through the film original and enters the lens L. The transmitted light having entered lens L is condensed at the lens L and the condensed light enters the line sensor 21. The line sensor 21 may be constituted of, for instance, a CCD having a plurality of photoelectric conversion elements arrayed on a line perpendicular to the longer side of the original within a plane parallel to the film original. Each element constituting the line sensor 21 stores an electrical charge corresponding to the intensity of the light having entered therein. The operational timing, the length of time over which the electrical charge is stored and the like are individually controlled for each element by the timing control circuit 18. The length of time over which the electrical charge is stored is determined in conformance to a command transmitted from the CPU 11 to the timing control circuit 18. As the charge storage operation is completed at the line sensor 21, the stored charges at the individual elements are output as image signals.

The analog signal processing circuit 15 amplifies the image signals output from the line sensor 21, executes analog signal processing of the known art such as noise removal, dark current correction and compensation of Even/Odd black level DC difference and then outputs the image signals having undergone the signal processing to the A/D converter 16. The operational timing of the analog signal processing circuit 15 is controlled by the timing control circuit 18. The A/D converter 16 executes an A/D conversion on the analog image signals input from the analog signal processing circuit 15, thereby obtaining digital image data. An operational timing signal such as a conversion clock for the A/D converter 16 is provided by the timing control circuit 18.

The digital signal processing circuit 17 executes image processing such as shading correction, gradation correction and color balance correction on the digital image data and outputs the image data having undergone the image processing to the memory 12. The digital signal processing circuit 17 includes an LUT (lookup table) having stored therein gradation characteristics conversion data.

The original drive motor drive circuit 19 rotates the original drive motor 22 in response to a command issued by the CPU 11 and thus feeds the film original by driving a feeding mechanism (not shown). By adjusting the rotating speed and the rotating direction of the original drive motor 22, the film original can be fed, advanced or rewound. It is to be noted that FIG. 1 does not include an illustration of the take-up unit at which the film original is taken up.

In the embodiment, the original drive motor 22 is also utilized for sub-scanning during an image scanning operation. The film original is sub-scanned or conveyed along the direction in which the longer side of the film original extends each time an image corresponding to a single line is captured at the line sensor 21 so as to allow the line sensor 21 to capture the image of the entire film original plane. By repeatedly executing a main scanning operation to capture an image of a single line at a time with the line sensor 21 while sub-scanning the film original with the original drive motor drive circuit 19, the image of the film original plane is captured with the line sensor 21 and the image is scanned.

The original position detection sensor 25 transmits a detection signal obtained by detecting, for instance, a perforation in the film to the CPU 11. The CPU 11 detects the position of the film original by counting detection signals provided by the original position detection sensor 25. The optical information scanning sensor 24 detects optical information which may be, for instance, a bar code on the film original and transmits the detection signal to the CPU 11. The CPU 11 obtains information with regard to the film original from the detection signal provided by the optical information scanning sensor 24.

The magnetic head 26 detects magnetic information which may be, for instance, recorded in the film and transmits the detection signal to the magnetic signal processing circuit 20. It also records information transmitted from the magnetic signal processing circuit 20 into the film. The magnetic signal processing circuit 20 converts a signal detected at the magnetic head 26 to a digital signal by shaping it and also shapes information to be recorded transmitted from the CPU 11 and outputs the shaped information to the magnetic head 26.

The original is read or scanned through the following procedural steps at the image scanning unit 1 described above.
1. Insert the film original.
2. Capture thumbnail images (read thumbnail images).
3. Specify a frame to be scanned.
4. Set scanning conditions.
5. Perform preliminary image-capturing operation (read a reference image)
6. Set image-capturing conditions.
7. Perform main image-capturing operation (read main image).

Thumbnail images are roughly scanned images which are used to select a frame to be scanned. A thumbnail image is normally captured for each of the frames in the film original.

A reference image is used to determine the exposure conditions and the like. In the embodiment, the CPU 11 of the image scanning unit 1 uses the reference image data to detect the density distribution in the image in the corresponding frame.

The following settings may be selected by the operator as the scanning conditions. If there are a plurality of frames to be scanned, the conditions can be specified for each frame. An initial value is set in advance for each of the items constituting the scanning conditions, and the initial values are stored in the memory 12. It is to be noted that the initial values set for the individual items are used when capturing thumbnail images.
1 the scanning range of the film original
2 the number of pixels to constitute the scanned image data, i.e., the resolution of the scanned image data
3 the contrast of the scanned image data
4 the color balance in the scanned image data
5 the gradation of the scanned image data, i.e., the tone curve of the scanned image data The image-capturing conditions include the light output quantity of the LED light source 23, the length of time over which electrical charges are to be stored at the line sensor 21 and the order in which electric charges are to be stored at the individual elements, set for the main image-capturing operation. The image-capturing conditions are determined by the CPU 11 at the image scanning unit 1 in correspondence to the density distribution in the image. It is to be noted that initial values set in advance for the items constituting the image-capturing conditions are used as the image-capturing conditions under which the thumbnail image-capturing operation and the preliminary image-capturing operation are performed.

The image scanning unit 1 in the embodiment continuously executes 5) preliminary image-capturing operation, 6) image-capturing condition setting and 7) main image-capturing operation among the scanning procedural steps described above, automatically in response to a scan start instruction. If a plurality of frames are specified for the scanning, the plurality of frames of images are continuously scanned (a continuous scan). The present invention is characterized in that the length of time required to execute the scan processing after the scan start instruction is issued, that is, the estimated length of processing time is calculated through an arithmetic operation. The length of scan processing time is calculated for each procedural step to be executed for a given frame.

Figure 2:
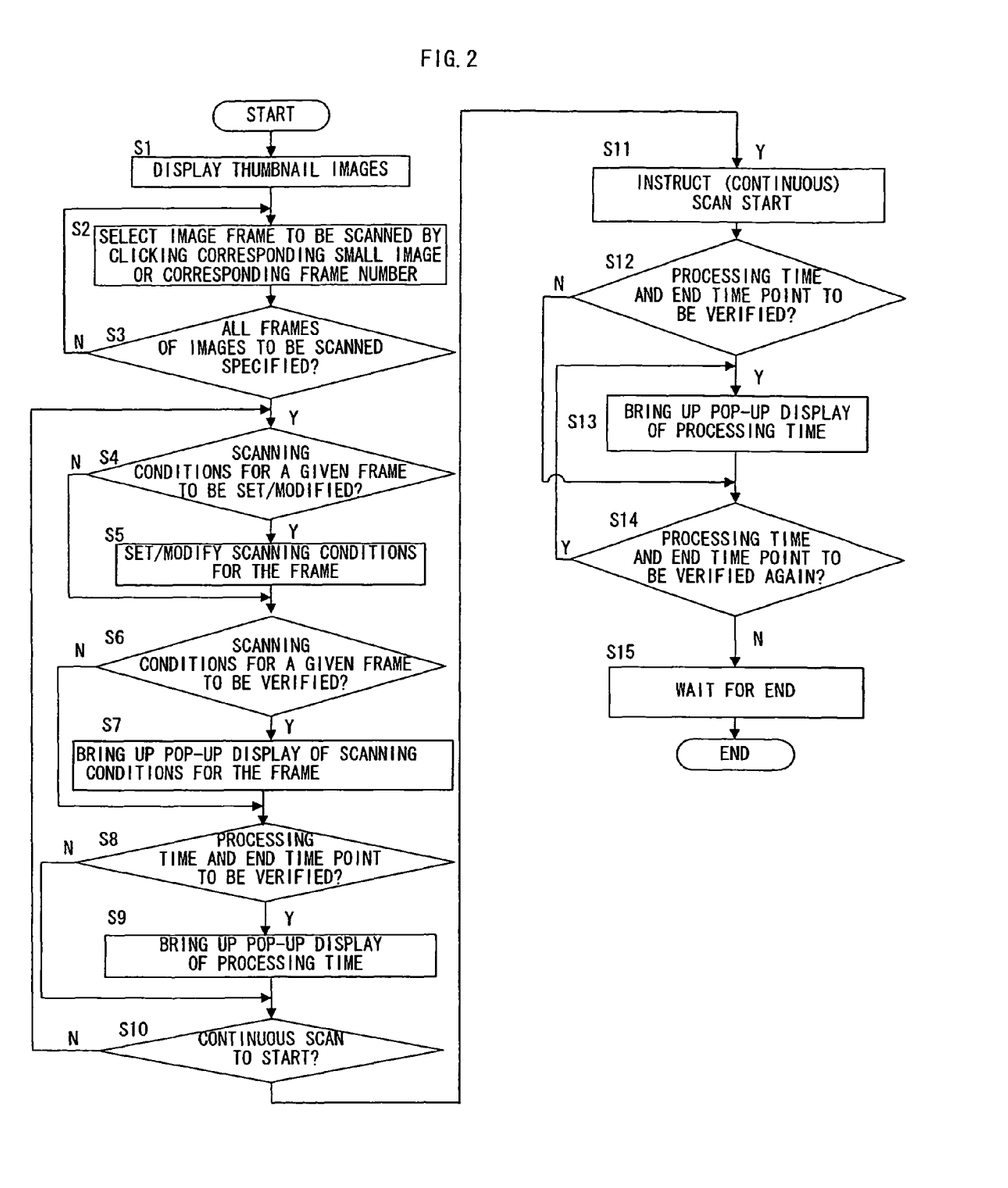
FIG. 2 presents a flowchart of the processing executed at the host computer.

FIG. 2 presents a flowchart of the processing executed at the host computer 2 connected with the image scanning unit 1. After setting the film original at the image scanning unit 1, the operator engages the host computer 2 in the execution of an image scanning program. The operator specifies the type of the film original an image of which is to be scanned in a menu (not shown) brought up on display at the monitor 2A. Possible film original types include, for instance, positive film, color negative film and monochrome negative film.

As the operator performs a start operation by specifying the original type, a thumbnail image-capturing instruction is transmitted from the host computer 2 to the image scanning unit 1. Upon receiving the thumbnail image-capturing instruction via the interface circuit 13, the CPU 11 issues an instruction for the original drive motor drive circuit 19 to feed the film original. When the CPU 11 judges that the base portion of the leading frame of the film original has reached the image-capturing range of the area sensor 21 based upon the detection signal input from the original position detection sensor 25, the CPU 11 outputs a command to the timing control circuit 18 and thus issues an instruction to capture an image of the base portion. The base portion of the leading frame is an area outside the image recording area, where no image has been recorded. The CPU 11 detects the density in the base portion based upon the signal level indicated by the image-capturing signal obtained at the line sensor 21.

The CPU 11 obtains the magnetic information via the magnetic head 26 and the magnetic signal processing circuit 20, and also obtains the optical information via the optical information scanning sensor 24, while engaging the original drive motor drive circuit 19 to feed the film original over the full frame range. The individual sets of information each obtained in correspondence to one of the frame numbers are then stored by the CPU 11 into the memory 12 in correspondence to the specific frame numbers. In addition, while obtaining the magnetic information and the optical information, the CPU 11 outputs a command individually to the illumination LED drive circuit 14 and the timing control circuit 18 so as to capture thumbnail images of all the frames in the film original.

The CPU 11 outputs a command for the digital signal processing circuit 17 to execute image processing on the image signals obtained through the thumbnail image-capturing operation at the scanning condition initial values, and then transmits the image data having undergone the image processing to the host computer 2 via the interface circuit 13.

Figure 3:
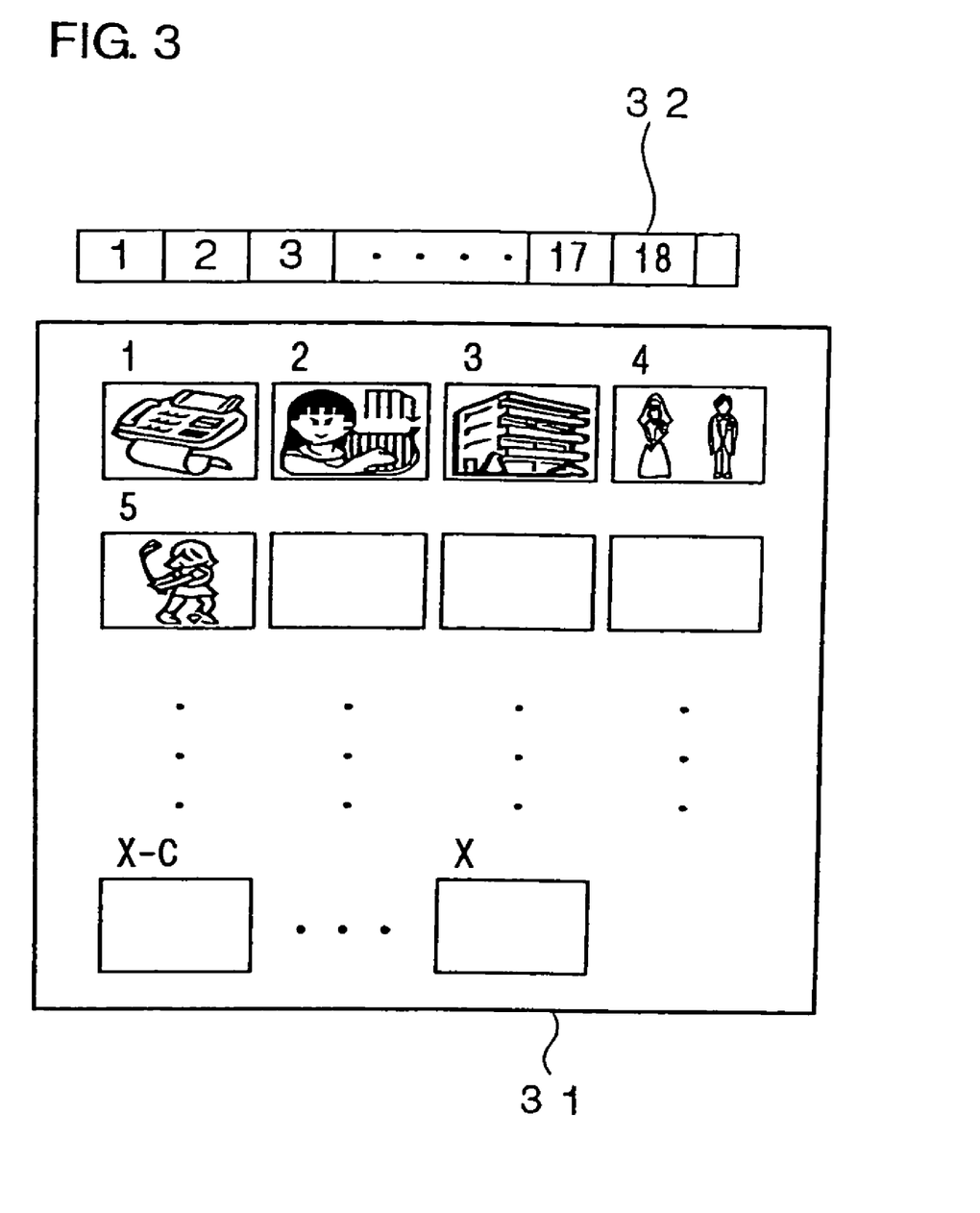
FIG. 3 presents a display example of the thumbnail image display area and the continuous scan registration bar.

In step S1 in FIG. 2, the host computer 2 displays the received thumbnail image data at the display window inside the monitor 2A and then the operation proceeds to step S2. FIG. 3 presents a display example of a thumbnail image display area 31 and a continuous scan registration list bar 32 brought up on display inside the window. In the thumbnail image display area 31, a thumbnail image corresponding to frame number 1 is displayed at the upper left corner of the area and a thumbnail image corresponding to frame number 5 is displayed at the left end in the second row in the area. In each subsequent row, four thumbnail images are displayed from left to right, with the last row ending with frame number X. In the continuous scan registration list bar 32, the frame numbers assigned to the images to be scanned are displayed. It is to be noted that since the images to be read are specified in the next step S2, the continuous scan registration list bar 32 is blank at this point.

The operator specifies the frame numbers of the images to be scanned from X thumbnail images displayed inside the thumbnail image display area 31 at the monitor 2A by operating the operating member 2B. In step S2, as the operating member 2B is clicked while the cursor is placed on the thumbnail image corresponding to a given frame number or on a given frame number, the host computer 2 displays a registration number at the continuous scan registration list bar 32 and also registers the frame number as the number assigned to the image to undergo a main read operation. The registration number starts from 1 and is incremented each time a new frame to be scanned is specified. In the example presented in FIG. 3, 18 frames of images have been specified for the scan.

In step S3 in FIG. 2, the host computer 2 makes a decision as to whether or not the frames of the images to be scanned have all been specified. The host computer 2 makes an affirmative decision in step S3 if the operator has selected an item for the completion of the specification of the frames to be scanned from a menu (not shown), and then the operation proceeds to step S4. If, on the other hand, the operation to complete the specification of the frames to be scanned has not been performed, the host computer 2 makes a negative decision in step S3 and the operation returns to step S2.

In step S4, the host computer 2 makes a decision as to whether or not the scanning conditions are to be set. The host computer 2 makes an affirmative decision in step S4 if an operation to change the initial value of a scanning condition has been performed via the operating member 2B, and the operation proceeds to step S5 in this case. If, on the other hand, no operation to change any of the scanning conditions has been performed, it makes a negative decision in step S4 and the operation proceeds to step S6.

The following settings may be selected as the scanning conditions. An initial value is set in advance for each of the items constituting the scanning conditions, and the initial values are stored in the memory 12 shown in FIG. 1. The scanning conditions can be set for each of the frames of images to be scanned.

1 the scanning range of the film original
2 the number of pixels to constitute the scanned image data, i.e., the resolution of the scanned image data
3 the contrast of the scanned image data
4 the color balance in the scanned image data
5 the gradation of the scanned image data, i.e., the tone curve of the scanned image data In step S5, the host computer 2 individually sets the scanning conditions as described below, before the operation proceeds to step S6.
1 scanning range of the film original If the operator wishes to scan an image over a range different from the range of the thumbnail image displayed inside the thumbnail image display area 31 shown in FIG. 3, he selects (crops) the desired scanning range by, for instance, dragging the operating member 2B. It is to be noted that the cropping operation can be executed by displaying the thumbnail image in an enlargement. The host computer 2 sets the cropped range as the scanning range for the corresponding frame.
2 the resolution of the scanned image data As the desired resolution of the image data, the operator enters, for instance, the number of pixels per inch, i.e., the unit dpi (dots per inch), via the operating member 2B. The host computer 2 sets the number of pixels X along the horizontal direction and the number of pixels Y along the vertical direction to constitute the scanned image data in correspondence to the dpi value.
3 the contrast of the scanned image data The operator moves a slider displayed, for instance, in a contrast setting palette (not shown) by dragging the operating member 2B. If the slider is moved along the direction to raise the contrast, the host computer 2 sets the contrast higher than the initial value, whereas if the slider is moved along the direction to lower the contrast, the host computer 2 sets the contrast lower than the initial value. It sets the contrast at the initial value if the slider is moved to the central position.
4 the color balance of the scanned image data The operator moves sliders displayed, for instance, in a color balance setting palette (not shown) by dragging the operating member 2B. If a slider "R" for red is moved along the direction to intensify the red color, the host computer 2 sets the red color intensity higher than the initial value, whereas if the slider "R" for red is moved along the direction to lower the intensity, it sets the red color intensity lower than the initial value. If the slider for red is moved to the central position, the host computer 2 sets the red color intensity to the initial value. The green color intensity and the blue color intensity are set in a similar manner by moving a slider "G" for green and a slider "B" for green respectively.
5 the tone curve of the scanned image data The operator manipulates the gradation curve displayed in, for instance, a tone curve setting palette (not shown) by dragging the operating member 2B. The host computer 2 modifies a correction curve to be used to correct the image data gradation in correspondence to the modified gradation curve.

In step S6 in FIG. 2, the host computer 2 makes a decision as to whether or not the scanning conditions are to be verified. If the operator has performed an operation to verify the scanning conditions, the host computer 2 makes an affirmative decision in step S6 and the operation proceeds to step S7. If, on the other hand, an operation for verifying the scanning conditions has not been performed, the host computer 2 makes a negative decision in step S6 and the operation proceeds to step S8.

In step S7, the host computer 2 brings up the individual scanning conditions on display as described below, before the operation proceeds to step S8.

The operator specifies a frame of image data with regard to which he wishes to verify the scanning conditions among the X thumbnail images displayed inside the thumbnail image display area 31 at the monitor 2A by operating the operating member 2B. If, for instance, the cursor is placed at the image assigned with frame number 3, the host computer 2 brings up a pop-up display of the scanning (scan) order, the scanning conditions, the estimated length of required scan processing time and the like corresponding to the frame.

Figure 4:
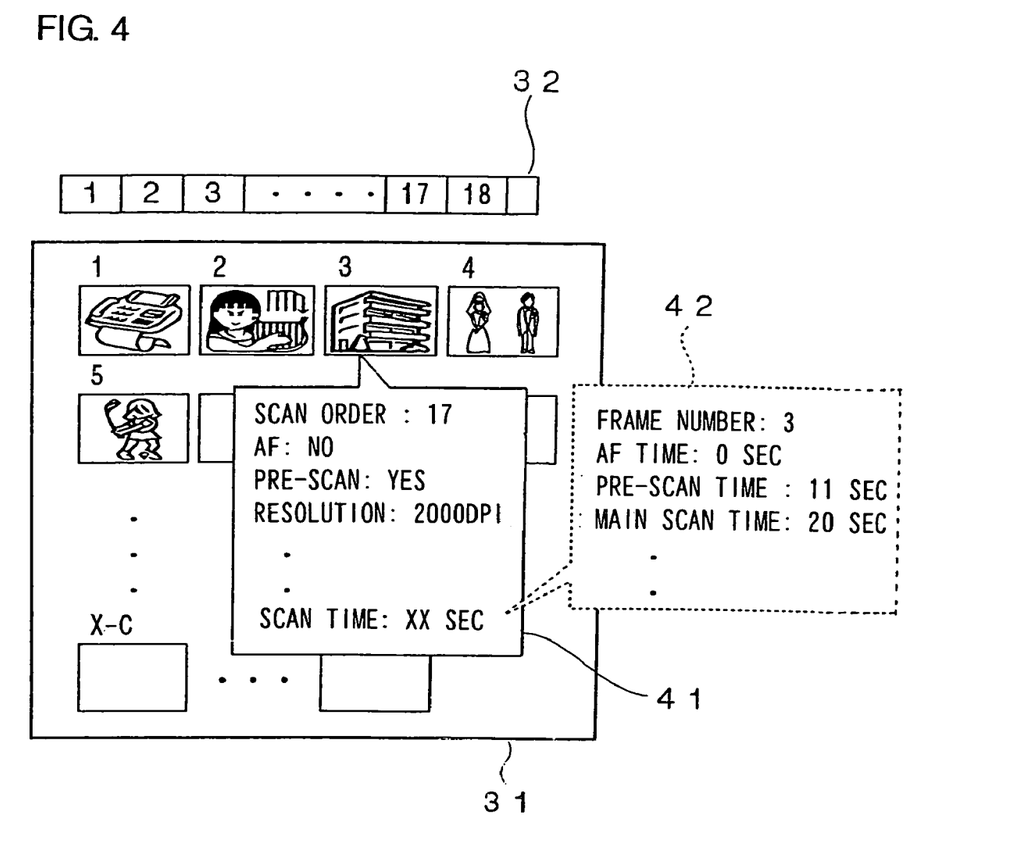
FIG. 4 presents a display example of a pop-up window.

FIG. 4 presents a display example of a pop-up window 41. "SCAN ORDER: SEVENTEENTH" in the pop-up window 41, which matches the registration number in the continuous scan registration list bar 32, indicates that the image is to be scanned seventeenth in the scan order. "AF: NO" indicates that autofocus processing prior to the preliminary image-capturing operation is to be skipped. If, on the other hand, "AF: YES" is set, autofocus processing of the known art is executed before the preliminary image-capturing operation. "PRE-SCAN: YES" indicates that the preliminary image-capturing operations is to be executed. "RESOLUTION" and the subsequent items on display indicate the information on the settings selected for the scanning conditions 1 to 5 described above. "SCAN TIME" indicates the total of the estimated processing time to scan the frame (frame number 3 in this example). The estimated processing time is to be described in detail later.

If the cursor is placed on, for instance, the display of "SCAN TIME" inside the pop-up window 41, the host computer 2 brings up a pop-up display of the estimated lengths of time required to execute the individual steps during the scan. "FRAME NUMBER: 3" in a pop-up window 42 in FIG. 4 indicates the number assigned to the frame. "AF TIME: 0 sec" indicates the estimated length of required processing time for the autofocus processing. When "AF: NO" is selected, the length of processing time on display is 0 sec. "PRE-SCAN TIME: 11 sec" indicates the estimated length of required processing time for the preliminary image-capturing operation. "MAIN SCAN TIME: 20 sec" indicates the estimated length of required processing time for the main image-capturing operation.

In step S8 in FIG. 2, the host computer 2 makes a decision as to whether or not the processing time is to be verified. The host computer 2 makes an affirmative decision in step S8 if the operator has performed an operation for verifying the processing time and the processing end time point, and the operation proceeds to step S9 in this case. If, on the other hand, the operation to verify the processing time has not been performed, the host computer 2 makes a negative decision in step S8 and the operation proceeds to step S10.

In step S9, the host computer 2 brings up a display of the processing time as described below, and the operation proceeds to step S10.

The operator specifies the blank area to the right of the last registration number (18 in this example) in the continuous scan registration list bar 32 displayed at the monitor 2A by operating the operating member 2B. If, for instance, the cursor is placed at the blank area to the right of frame number 18, the host computer 2 brings up a pop-up display of the length of time required to scan all the frames of images that are registered, the current time point and the like.

Figure 5:
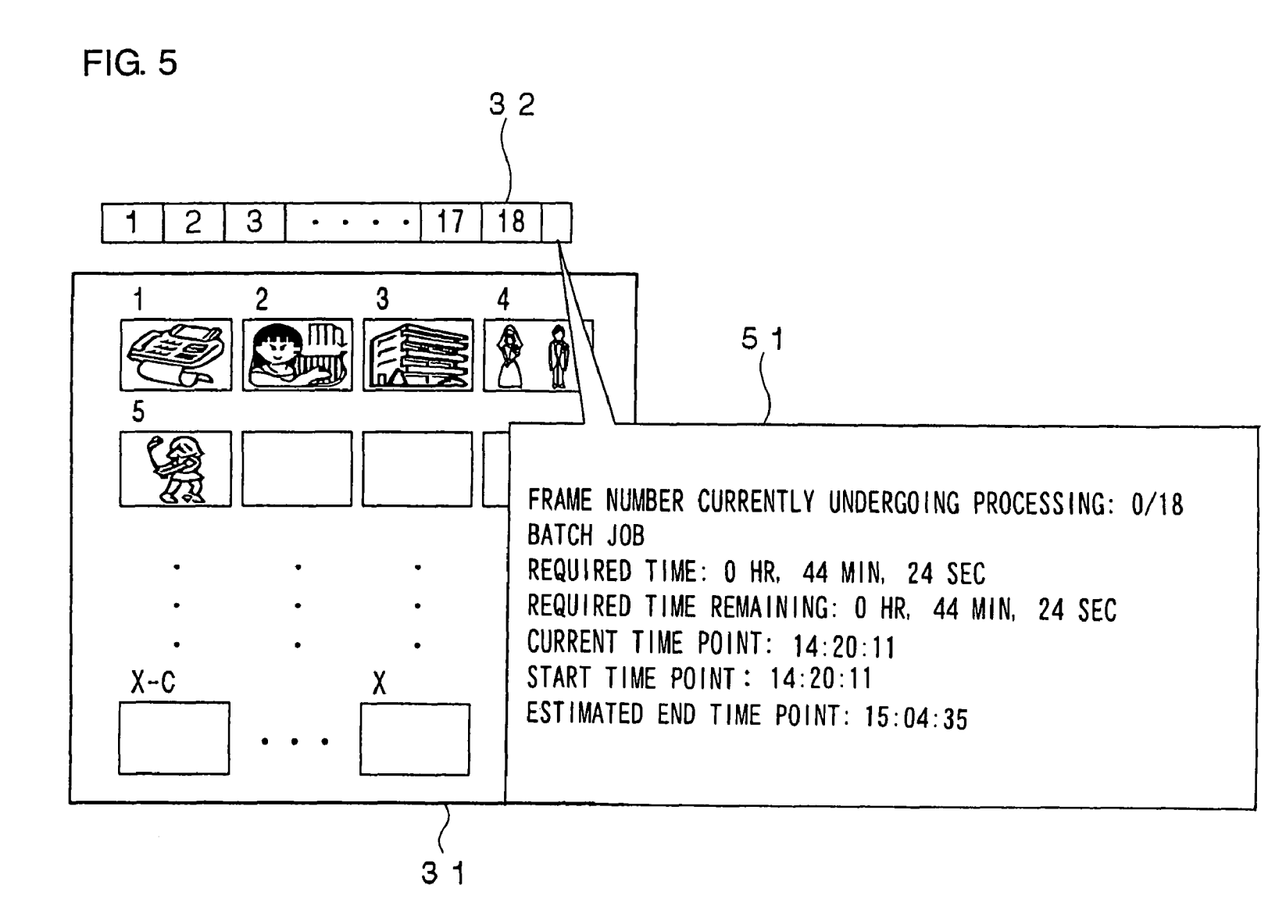
FIG. 5 presents a display example of a pop-up window.

FIG. 5 presents a display example of a pop-up window 51. "FRAME NUMBER CURRENTLY UNDERGOING PROCESSING: 0/18" in the pop-up window 51 indicates that the image scan has not started yet. "REQUIRED TIME: 0 hour, 44 min, 24 sec" indicates the estimated length of time required to scan all the frames of images. "REQUIRED TIME REMAINING: 0 hour, 44 min, 24 sec" indicates the same value as the required time since the scan has not started yet. "CURRENT TIME POINT: 14:20:11" is the current time point read out from a clock inside the host computer 2. "START TIME POINT: 14:20:11" indicates the same value as that of the current time point since the scan is yet to start. "END TIME POINT: 15:04:35" indicates the time point calculated by adding the required time remaining to the start time point.

In step S10 in FIG. 2, the host computer 2 makes a decision as to whether or not the continuous scan is to be started. The host computer 2 makes an affirmative decision in step S10 if the operator has executed an operation to instruct a scan start and the operation proceeds to step S11. If, on the other hand, no operation to instruct a scan start has been performed, the host computer 2 makes a negative decision in step S10 and the operation returns to step S4.

In step S11, the host computer 2 transmits the information on the frames of images to be scanned, i.e., the specific frames of images to be scanned and the scan order, the scanning conditions, both set as explained above, and a start instruction to the image scanning unit 1. Then the operation proceeds to step S12.

As the CPU 11 at the image scanning unit 1 receives the information on the frames of images to be scanned, the scanning conditions and the start instruction from the host computer 2, the CPU 11 changes the scanning conditions from their initial values as necessary and stores the modified scanning conditions into the memory 12 in correspondence to the individual frame numbers assigned to the images to be scanned. In addition, the CPU 11 issues a command for the original drive motor drive circuit 19 to feed the first frame to be scanned to the position at which the line sensor 21 is set. The CPU 11 individually outputs commands to the illumination LED drive circuit 14 and the timing control circuit 18 to execute a preliminary image-capturing operation for the frame. The CPU 11 determines the density distribution in the image in the frame based upon the image data output from the digital signal processing circuit 17.

The CPU 11 executes an exposure calculation in conformance to the lowest density, the highest density and the density frequency distribution in the frame and determines the image-capturing conditions such as the light output from the LED light source 23 and the length of the charge storage time at the line sensor 21 under which the main image-capturing operation is to be executed. If the light output from the LED light source 23 is set at a constant value, the length of charge storage time should be varied. The CPU 11 sets the image-capturing conditions at the timing control circuit 18 and the illumination LED drive circuit 14, and also sets the scanning conditions for the current frame at the digital signal processing circuit 17. Thus, the digital signal processing circuit 17 is enabled to prepare image processing parameters corresponding to the scanning conditions that have been set.

Then, the CPU 11 individually outputs commands to the illumination LED drive circuit 14 and the timing control circuit 18 to execute the main image-capturing operation for the frame. The CPU 11 stores the image data having undergone the image processing that are output from the digital signal processing circuit 17 into the memory 12. The CPU 11 transmits the scanned image in the memory 12 to the host computer 2 via the interface circuit 13.

The image scanning unit 1 repeatedly executes the preliminary image-capturing operation, the image-capturing condition selection and the main image-capturing operation for all the frames of images specified for the scan. It is to be noted that the CPU 11 transmits information indicating the length of time having been required to execute the autofocus processing, the length of time having been required to execute the preliminary image-capturing processing and the length of time having been required to execute the main image-capturing processing to the host computer 2 in correspondence to each frame. The host computer 2 registers these lengths of time having been required to execute the various types of processing in a database to be detailed later.

In step S12 in FIG. 2, the host computer 2 makes a decision as to whether or not the processing time is to be verified. The host computer 2 makes an affirmative decision in step S12 if the operator has performed an operation for verifying the processing time and the processing end time point, and the operation proceeds to step S13 in this case. If, on the other hand, the operation to verify the processing time has not been performed, the host computer 2 makes a negative decision in step S12 and the operation proceeds to step S14.

In step S13, the host computer 2 brings up a display of the processing time as described below, and the operation proceeds to step S14.

Figure 6:
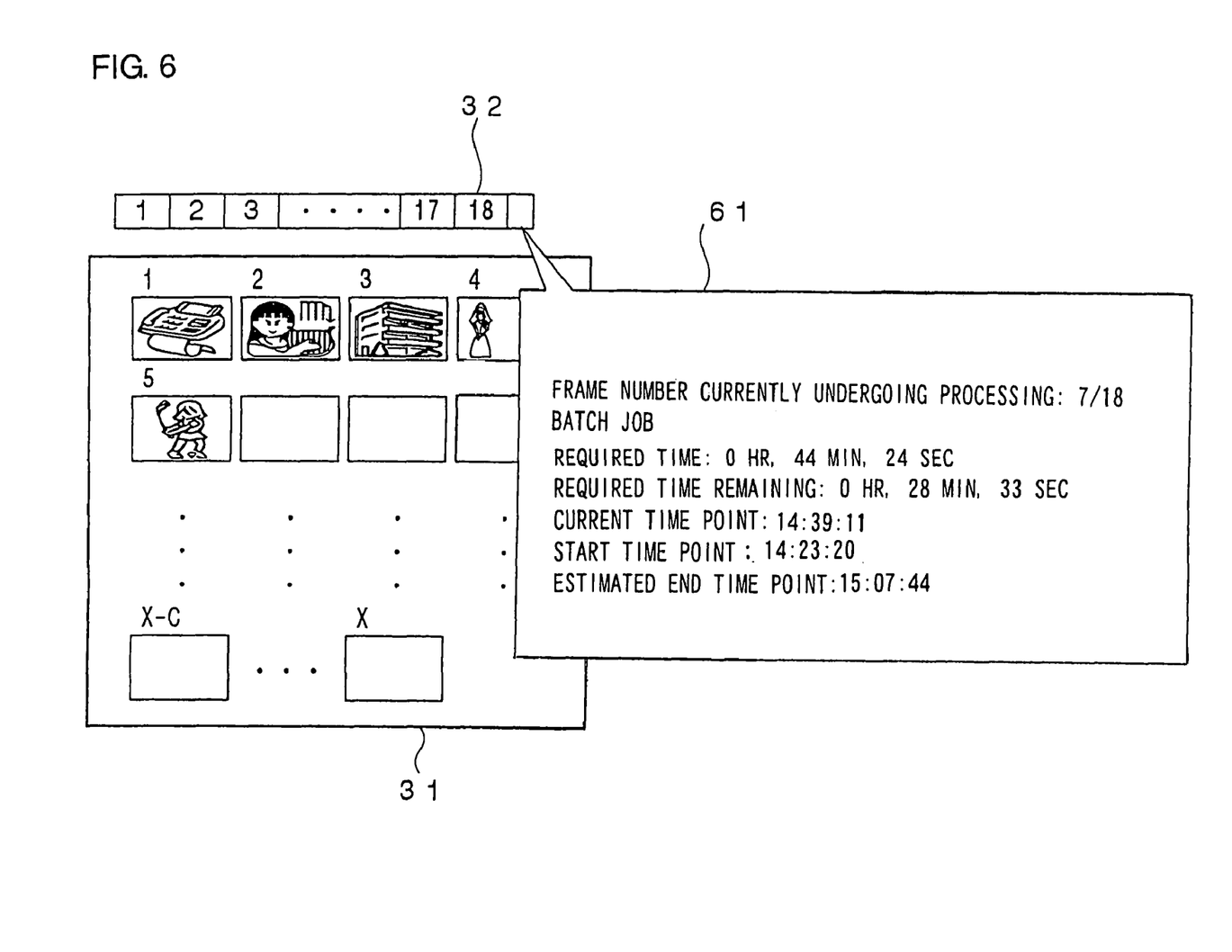
FIG. 6 presents a display example of a pop-up window.

The operator specifies the blank area to the right of the last registration number (18 in this example) in the continuous scan registration list bar 32 displayed at the monitor 2A by operating the operating member 2B. If, for instance, the cursor is placed at the blank area to the right of frame number 18, the host computer 2 brings up a pop-up display of the length of time required to scan all the frames of images that are registered, the current time point and the like. FIG. 6 presents a display example of a pop-up window 61. "FRAME NUMBER CURRENTLY UNDERGOING PROCESSING: 7/18" in the pop-up window 61 indicates that the seventh frame in the scan order among the 18 frames is currently undergoing the scan processing. "REQUIRED TIME: 0 hour, 44 min, 24 sec" indicates the estimated length of time required to scan all the frames of images. "REQUIRED TIME REMAINING: 0 hour, 28 min, 33 sec" indicates the estimated length of required processing time to elapse after the pop-up display is brought up. "CURRENT TIME POINT: 14:39:11" is the current time point read out from the clock inside the host computer 2. "START TIME POINT: 14:23:20" indicates the time point at which the scan start operation was performed. "END TIME POINT: 15:07:44" indicates the time point calculated by adding the required time remaining to the current time point.

In step S14 in FIG. 2, the host computer 2 makes a decision as to whether or not the processing time is to be verified again. The host computer 2 makes an affirmative decision in step S14 if the operator has performed an operation for verifying the processing time and the processing end time point, and the operation returns to step S13 in this case. If, on the other hand, the operation to verify the processing time has not been performed, the host computer 2 makes a negative decision in step S14 and the operation proceeds to step S15.

As the host computer 2 receives image data obtained through the main image-capturing operation executed on all the frames of images specified for the scan from the image scanning unit 1 in step S15, the processing in FIG. 2 ends. Through this processing, the image data in each of the frames having been continuously scanned are stored into a data storage device (not shown) inside the host computer 2.

Now, the estimated length of processing time is explained. Every time an original is scanned, the host computer 2 counts the length of time that elapses after the scan start is instructed until the image data are received from the image scanning unit 1 and registers the results of the count into the database. The database is provided inside the data storage device (not shown). The data in the database are classified in correspondence to, for instance, the original film types, the scanning conditions including the scanned image data resolutions and the individual steps such as the preliminary image-capturing operation and the main image-capturing operation.

In addition, the host computer 2 registers the lengths of time having been required to execute the various steps such as the autofocus processing, the preliminary image-capturing processing and the main image-capturing processing for each image frame received from the image scanning unit 1 into the database. Such information is not registered into the database if a given type of processing has not been completed in a normal manner. For instance, if the autofocus processing on a given image undergoing the scan has not been completed within a predetermined length of time due to low contrast, the autofocus processing time for the image is not registered in the database.

In addition, the processing time information is not registered if the corresponding processing is canceled while it is in progress. For instance, if the preliminary image-capturing processing on a given image is canceled while the processing is in progress, the corresponding length of preliminary image-capturing processing time is not registered in the database. The processing time information is not registered either if an error occurs while the processing is in progress. For instance, if an error is detected in the system, the corresponding length of processing time is not registered in the database.

The host computer 2 estimates a length of processing time by calculating the average of, for instance, the twenty values representing the twenty processing operations most recently executed by using the data registered in the database as described above. For instance, the estimated length of time required to execute the preliminary image-capturing operation is calculated as the average (the recent average) of the lengths of the preliminary image-capturing operations most recently executed on film originals of the same type at the same resolution by using the data registered in the database. The estimated length of time required to execute the main image-capturing operation, too, is calculated as the recent average of the lengths of main image-capturing operations most recently executed on film originals of the same type at the same resolution by using the data registered in the database.

The following advantages are achieved in the embodiment explained above.

(1) As the operator specifies a frame with regard to which he wishes to verify the scanning conditions from the X thumbnail images displayed inside the thumbnail image display area 31 at the monitor 2A by operating the operating member 2B, the host computer 2 displays the order in which the frame is to be scanned (scan order), the scanning conditions set for the frame, the estimated length of processing time and the like in the pop-up window 41. Thus, an image scanning system achieving a high degree of ease of use, which allows the operator to check the scanning information on a desired frame through a simple operation, can be provided.

(2) As the operator specifies the scan time display in the pop-up window 41 by operating the operating member 2B, the host computer 2 displays the lengths of time required to scan the frame in correspondence to the individual steps in the pop-up window 42. Thus, an image scanning system achieving a high degree of ease of use, which allows the operator to check the length of time required to scan the desired frame through a simple operation, can be provided.

(3) As the operator specifies the blank area to the right of the last registration number in the continuous scan registration list bar 32 displayed at the monitor 2A, e.g., registration number 18 in FIG. 6, by operating the operating member 2B, the host computer 2 displays the length of time required to scan all the frames of images that are registered, the current time point and the like in the pop-up window 61. Thus, an image scanning system achieving a high degree of ease of use, which allows the operator to check the frame number assigned to the image currently being scanned, the overall length of time required for the scan and the estimated length of time required to complete the scan after the pop-up display comes up through a simple operation, can be provided. Since the operator does not need to remain in the vicinity of the image scanning system once he instructs the scan start, the operator can use his time efficiently until the scan end time point. In addition, the scanning conditions such as the resolution set by the operator are reflected in the length of time required to complete the scan, i.e., the end time point, and thus, it is possible to scan images at the highest possible image quality even if a limited length of time can be spent for the scan.

(4) The length of time required or elapsed to execute an actual image scan is counted, and the results of the count are registered in the database in correspondence to the scanning conditions and the individual steps. Then, the average of the n values, e.g., twenty values, representing the lengths of time having been required for scan operations most recently executed is calculated as the estimated processing time. Thus, the estimated length of processing time is calculated statistically. As a result, the accuracy with which the required processing time is estimated improves even when the length of the scan time fluctuates as different images are scanned.

While the estimated length of processing time is calculated by averaging the values indicated by twenty sets of data having been registered in the database most recently, the number of sets of data used for this purpose does not need to be twenty. The estimated length of processing time may be calculated as the average of ten or one hundred values representing the lengths of time having been required to execute the processing most recently, instead.

Instead of calculating the average value of processing time lengths, the value that is most frequently indicated by the data registered in the database maybe used as the estimated length of processing time. In such a case, the value most frequently indicated in the data registered in the database in correspondence to specific scanning conditions and a specific step should be searched and used as the estimated length of processing time. The search conditions under which the most frequent value is searched in the database may be selected so that:

(1) the most frequent value is searched from all the data registered in the database,
(2) the most frequent value is searched, for instance, from twenty sets of data having been registered most recently, or
(3) the most frequent value is searched, for instance, from one hundred sets of data having been registered most recently.

The value most frequently indicated by the data registered in the database may be searched in the following manner. The lengths of processing time registered in the database are stratified in, for instance, 5-second increments and a range over which the greatest number of sets of data are distributed is selected. If, for instance, the greatest number of sets of data are distributed over the range of 20 seconds or longer and less than 25 seconds, the median of the range, i.e., 22.5 sec, is set as the estimated length of processing time.

The pop-up window 42 in FIG. 4 described above may include a display of the length of time required to feed the film. In such a case, the length of time required to feed the film original from the scanned frame position preceding the current frame to the current frame position should be indicated. By including the length of time required to feed the film original, the length of time required for the scan processing can be indicated even more accurately when images in consecutive frames in the film original are not scanned. It is to be noted that the scan time in the pop-up window 41 should indicate the length of time that includes the length of time required for the film feed in this case.

In addition, the display in the pop-up window 42 may include the length of time required to execute image processing as well. In such a case, the length of time required to execute the image processing at the digital signal processing circuit 17 should be displayed. The length of time required for the scan can be indicated more accurately by including the length of time required for the image processing when, for instance, the resolution is set to a high level or when a defect or the like contained in the image is automatically corrected during the image processing. It is to be noted that the scan time indicated in the pop-up window 41 should include the length of time required for the image processing in this case.

The pop-up window 42 may also include a display of the length of time required to execute the image data output processing. In such a case, the length of time required to output the data from the image scanning unit 1 to the host computer 2 should be indicated. The length of time required for the scan can be indicated more accurately by including the length of time required for the data output when, for instance, the resolution is set to a high level. It is to be noted that the scan time displayed in the pop-up window 41, too, should indicate the length of time that includes the length of time required for the image output in this case.

Instead of displaying the scanning conditions as in step S7 in FIG. 2 described above, they may be brought up on a pop-up display as described below. The operator specifies a registration number assigned to the image with regard to which he wishes to verify the scanning conditions among the registration numbers in the continuous scan registration list bar 32 (see FIG. 3) displayed at the monitor 2A by operating the operating member 2B. If, for instance, the cursor is placed on registration number 3, the host computer 2 brings up a pop-up display of the scan order, the scanning conditions, the estimated length of required scan processing time and the like corresponding to the frame.

Figure 7:
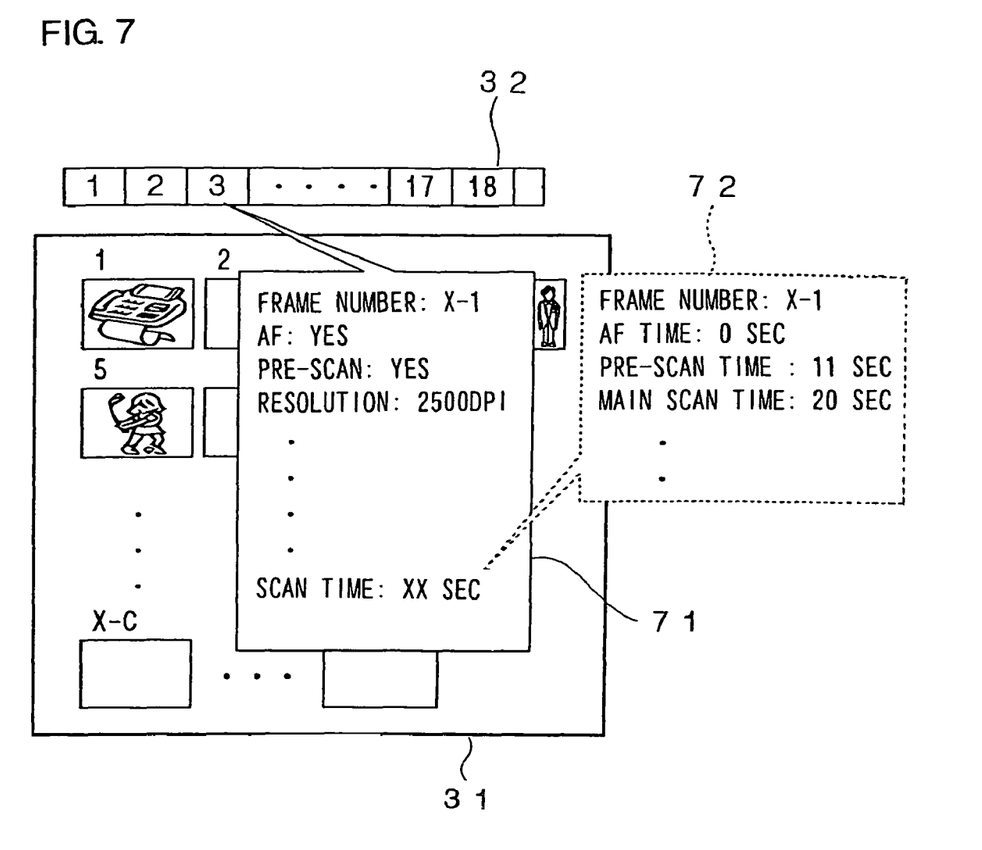
FIG. 7 presents a display example of a pop-up window.

FIG. 7 presents a display example of a pop-up window 71. "FRAME NUMBER: X−1" in the pop-up window 71 indicates that the frame number assigned to the image is (X−1). "AF: YES" indicates that autofocus processing is to be executed. "PRE-SCAN: YES" indicates that the preliminary image-capturing operation is to be executed. "RESOLUTION" and the subsequent items on display indicate the information on the settings selected for the scanning conditions 1 to 5 described earlier. "SCAN TIME" indicates the total of the estimated processing time required to scan the frame (frame number (X−1) in this example). Since the pop-up window 72 is similar to the pop-up window 42 in FIG. 4 described earlier, its explanation is omitted.

The contents of the information displayed in the pop-up windows 41, 42, 51, 61, 71 and 72 may be reproduced as audio data.

While the thumbnail image-capturing operation and the preliminary image-capturing operation are executed individually in the explanation given above, the preliminary image-capturing operation may be skipped by detecting the density distribution in the image data obtained by capturing the thumbnail image.

While an explanation is given above on an example in which a plurality of specified frames (designated frames) of images are continuously scanned, the present invention may instead be adopted in a single frame scan for scanning a single image frame.

In the embodiment described above, the image scanning system comprises the image scanning unit 1 and the host computer 2 and operational instructions are issued from the host computer 2. In addition, in the example explained above, the image-capturing conditions are determined at the CPU 11 of the image scanning unit 1, whereas the calculation of the estimated length of processing time is executed and the processing time database is located at the host computer 2. Instead, the processing listed above may all be executed at the CPU 11 and a database may be set up inside the memory 12. In such a case, the host computer 2 simply issues operational instructions and executes display operations.

The image processing system may assume a stand-alone structure by providing an operating member and a monitor display circuit at the images canning unit 1. Such a structure does not require the host computer 2.

While an explanation is given above on an example in which the present invention is adopted in an image scanning system, programs for enabling execution of the image scan processing that is executed at the image scanning unit 1 and the host computer 2 in the example explained above may be prepared separately and installed in an image scanning unit or a host computer 2 so as to allow the image scanning unit 1 and the host computer 2 to be utilized as an image scanning system. In such a case, the image scanning system operates by executing the programs loaded into the memory 12 of the image scanning unit 1 and a data storage device at a personal computer or the like. It is to be noted that if the image scanning system adopts a stand-alone configuration, the program for the host computer 2 is not necessary. The programs may be loaded by installing recording media having the programs stored therein or they may be loaded via a network.

The above described embodiment is an example, and various modifications can be made without departing from the spirit and scope of the invention.

What is claimed is:

1. An image scanning system comprising:
    an image-capturing device that executes a preliminary image-capturing operation and a main image-capturing operation on a scan original to capture an image of the scan original and outputs image signals;
    an image processing circuit that executes image processing on the image signals;
    an image signal output device that outputs the image signals having undergone the image processing;
    a storage device in which previous actual lengths of required time to process a previous scan original are stored in memory in correspondence to each of the steps, the actual length of time being a length of time having been required to actually execute steps of, at least, the preliminary image-capturing operation, the main image-capturing operation, the image processing and the image signal output;
    a calculation device that calculates a total of lengths of required time to execute steps of, at least, the preliminary image-capturing operation, the main image-capturing operation, the image processing and the image signal output to process a new scan original based upon the previous actual lengths of required time for executing each corresponding step, which have been stored into the storage device; and
    a calculation result output device that outputs the estimated length of required time as calculation results obtained at the calculation device such that the estimated length of required time is displayed on an external monitor.

2. An image scanning system according to claim 1, wherein:
    the calculation device also calculates an estimated end time point by adding the estimated length of required time to a current time point; and
    the calculation result output device outputs the estimated length of required time and the estimated end time point.

3. An image scanning system according to claim 1, wherein the calculation device calculates a length of required time to execute each of the steps by averaging n values each representing the previous actual length of required time for executing the step, which have been stored into the storage device most recently.

4. An image scanning system according to claim 3, further comprising:
    a control device that controls the storage device so as not to store the actual length of required time corresponding to a step among the steps under at least one of following conditions: if the actual length of required time for the step exceeds a predetermined length of time; if the step is canceled while the step is in progress; and if an error occurs during the step.

5. An image scanning system according to claim 3, wherein:
    the calculation result output device also outputs the length of required time to execute each of the steps.

6. An image scanning system according to claim 1, wherein the calculation device calculates the length of required time to execute each of the steps as a value most frequently indicated among values each representing the previous actual length of required time for executing the step, which have been stored in the storage device.

7. An image scanning system according to claim 6, further comprising:
    a control device that controls the storage device so as not to store the actual length of required time corresponding to a step among the steps under at least one of following conditions: if the actual length of required time for the step exceeds a predetermined length of time; if the step is canceled while the step is in progress; and if an error occurs during the step.

8. An image scanning system according to claim 6, wherein:
    the calculation result output device also outputs the length of required time to execute each of the steps.

9. An image scanning system according to claim 1, wherein:
    the calculation result output device also outputs a length of required time to execute each of the steps.

10. An image scanning system according to claim 1, wherein:
    the scan original includes a plurality of frames;
    the calculation device calculates the estimated length of required time to complete output of all the image signals corresponding to designated frames among the plurality of frames after a scan instruction is issued with regard to the designated frames; and
    the calculation result output device outputs calculation results obtained by the calculation device.

11. An image scanning system according to claim 10, wherein:
    the image-capturing device executes a preliminary image-capturing operation and a main image-capturing operation for each of the designated frames; and
    the calculation device calculates lengths of time required to execute steps of, at least, the preliminary image-capturing operation, the main image-capturing operation, the image processing and the image signal output for each of the designated frames and also calculates a length of required time to feed the scan original.

12. An image scanning system according to claim 11, further comprising:
a storage device in which an actual length of required time is stored in memory in correspondence to each of the steps and a feed time that has been required to actually feed the scan original is also stored in memory, the actual length of required time being a length of time having been required to actually execute a step, wherein:
the calculation device (a) calculates a length of required time to execute each of the steps by averaging n values each representing the actual lengths of required time for executing a step, which have been stored into the storage device most recently and (b) calculates the length of required time to feed the scan original by averaging n values each representing the feed time, which have been stored into the storage device most recently.

13. An image scanning system according to claim 11, further comprising:
a storage device in which an actual length of required time is stored in memory in correspondence to each of the steps, and a feed time that has been required to actually feed the scan original is also stored in memory, the actual length of required time being a length of time having been required to actually execute a step, wherein:
the calculation device (a) calculates a length of required time to execute each of the steps as a value most frequently indicated among values each representing the actual length of required time for executing a step, that have been stored in the storage device and (b) calculates the length of required time to feed the scan original as a value most frequently indicated among values each representing the feed time, that have been stored in the storage device.

14. A computer-readable medium encoded with computer-executable program instructions, the computer-executable program instructions comprising:
a start instruction for starting a preliminary image-capturing operation and a main image-capturing operation on a scan original to capture an image of the scan original;
an image signal processing instruction for executing image processing on image signals obtained by capturing an image of the scan original;
an image signal output instruction for outputting the image signals having undergone the image processing;
a storage instruction in which previous actual lengths of required time to process a previous scan original are stored in memory in correspondence to each of the steps, the actual length of time being a length of time having been required to actually execute steps of, at least, the preliminary image-capturing operation, the main image-capturing operation the image processing and the image signal output;
a calculate instruction for calculating a total of lengths of required time to execute steps of, at least, the preliminary image-capturing operation, the main image-capturing operation, the image processing and the image signal output to process a new scan original based upon the previous actual lengths of required time for executing each corresponding step, which have been stored;
a calculation result output instruction for outputting the estimated length of required time as calculation results obtained in response to the calculate instruction such that the estimated length of required time is displayed on an external monitor.

15. A computer-readable medium encoded with computer-executable program instructions according to claim 14, wherein:
control is implemented in conformance to the calculation instruction so as to further calculate an estimated end time point obtained by adding the estimated length of required time to a current time point; and
control is implemented in conformance to the calculation result output instruction so as to output the estimated length of required time and the estimated end time point.

16. An image scanning method, comprising:
executing a preliminary image-capturing operation and a main image-capturing operation on a scan original to capture an image of the scan original;
executing image processing on image signals obtained by capturing the image of the scan original;
outputting the image signals having undergone the image processing;
storing previous actual lengths of required time to process a previous scan original in memory in correspondence to each of the steps, the actual length of time being a length of time having been required to actually execute steps of, at least, the preliminary image-capturing operation, the main image-capturing operation, the image processing and the image signal output;
calculating a total of lengths of required time to execute steps of, at least, the preliminary image-capturing operation, the main image-capturing operation, the image processing and the image signal output to process a new scan original based upon the previous actual lengths of required time for executing each corresponding step, which have been stored; and
outputting calculation results with regard to the estimated length of required time such that the estimated length of required time is displayed on an external monitor.

* * * * *